United States Patent [19]

Ausländer et al.

[11] Patent Number: 4,881,036
[45] Date of Patent: Nov. 14, 1989

[54] PHASE SHIFT COMPENSATION FOR METAL DETECTION APPARATUS

[75] Inventors: Klaus Ausländer, Reutlingen; Hans-Jürgen Fabris, Pfullingen; Wolfgang Patzwaldt, Reutlingen; Helmut Seichter, Pfullingen, all of Fed. Rep. of Germany

[73] Assignee: Institut Dr. Friedrich Förster Prüfgerätebau GmbH, Reutlingen, Fed. Rep. of Germany

[21] Appl. No.: 74,232

[22] Filed: Jul. 16, 1987

[30] Foreign Application Priority Data

Mar. 30, 1987 [DE] Fed. Rep. of Germany ....... 3707210

[51] Int. Cl.⁴ ......................... G01V 3/11; G01V 3/165
[52] U.S. Cl. ..................................... 324/329; 324/233; 324/239
[58] Field of Search ............... 324/233, 239, 329, 202, 324/327, 328; 361/180

[56] References Cited

U.S. PATENT DOCUMENTS

| 2,438,197 | 3/1948 | Wheeler | 324/328 X |
| 3,496,455 | 2/1970 | Gouilloud | 324/339 |
| 3,835,371 | 9/1974 | Mirdadian et al. | 324/329 |
| 4,084,135 | 4/1978 | Enabit | 324/239 X |
| 4,249,128 | 2/1981 | Karbowski | 324/329 |
| 4,486,713 | 12/1984 | Gifford | 324/329 |
| 4,628,265 | 12/1986 | Johnson et al. | 324/233 X |
| 4,700,139 | 10/1987 | Podhrasky | 324/233 X |
| 4,719,421 | 1/1988 | Kerr | 324/239 X |

Primary Examiner—Gerard R. Strecker
Attorney, Agent, or Firm—George J. Netter

[57] ABSTRACT

A wire loop reference transmitter is coupled with the excitation winding and the receiver winding of metal detection apparatus and which can be alternately opened and closed through a switch. In another version the separation of the reference phase transmitter reference signal from other signals is accomplished by periodically turning the reference signal off and on at a predetermined switching frequency. According to a further version this separation is achieved by a phase control demodulator controlled by a switched-on reference signal of a first controllable phase and by a switched-off reference signal with a control signal to obtain a 180 degree second control phase. Still further, control signals of a phase controlled rectifier can be at 90 degrees to the reference signal of the reference phase transmitter.

6 Claims, 5 Drawing Sheets

PHASE SHIFT COMPENSATION FOR METAL DETECTION APPARATUS

The present invention relates generally to metal detection apparatus, and, more particularly to phase shift compensation for such apparatus enhancing detection of metal objects located in disturbance signal generating surroundings.

BACKGROUND OF THE INVENTION

Metal detection apparatus have been known for some time and available in a number of different forms and arrangements. They serve in general for the detection of hidden metal objects imbedded or hidden in a medium as, for example, the soil. This apparatus operates by having eddy currents induced in the metal objects by the magnetic alternating field of a search coil which build up a counterfield and react on the receiver spool. These signals are received in the apparatus receiver winding along with the reaction of disturbance or noise signals and are brought out as a common indication. These signals have a shape and phase corresponding to the physical characteristics of the metal objects in which the eddy currents are induced, the characteristic differences being especially in their phase basis. These differences are often used for the categorizing of the detected objects.

Frequently, the useful signals are covered over by disturbance or noise signals, which with respect to the sum total can be much greater than the signals of the sought after objects. The soil which surrounds the object is relevant. This soil can contain mineral components which possess a magnetic permeability greater than 1. In that case, one speaks of magnetizable soil, which results in additional A.C. magnetic flow through the search coil and by which a signal is produced in the latter.

On the other hand, especially on beaches, salt water can be the medium in the neighborhood of the sought after objects. In this situation, you have a reaction of an electrically weak conducting medium on the detection coil. The described background effects result in disturbance signals of interest, in that the phase of the signals from the magnetizable earth are at 90 degrees to those signals from the electrically weak conducting medium approximately in the zero direction of the impedance plane. Disturbance signals stand, therefore, in a fixed phase relationship to the signals of different sought after objects. This relationship can be used in order to separate useful and disturbance signals from one another and to suppress the effect of unwanted signals on the detection results.

A magnetizable soil with a magnetic permeability of $\mu = 1.15$ generates in the receiver windings of a typical metal detection apparatus a signal voltage of approximately 50 mV. In such search apparatus, the boundary sensitivity of signal voltages for the smallest metal objects is in the order of 1 microvolt. The search signal of the smallest detectable metal body can thus be mixed in with a 50 thousand times larger disturbance signal. Should such a disturbance signal be suppressed through an arrangement of the phase selection, stability of the phase basis to a small fraction of one degree is necessary. Even if the phase direction of the search signal from the metal body differs 90° from the accompanying disturbance signal, thus a small component of the disturbance signal in the direction of the search signal can be still many times greater than the latter.

An accumulated temperature change phase shift of 2–5 degrees experienced in the excitation and receiver windings, as well as in the circuit filters and amplifiers, can be compensated for by the use of stable circuit elements.

SUMMARY OF THE DESCRIPTION

A primary feature of the invention is to provide a metal detection apparatus in which through corresponding arrangements the phase shifts in the signal channel are suppressed in a necessary amount.

According to the invention, the signal phase relationships are held constant in a common transmission channel of the detection apparatus which includes the excitation and receiver windings. In that way, it is possible with greater precision to relate to the absolute phase angle changes in the impedance plane, which are generated by specific detected objects or disturbance background. In this manner, there are provided the conditions for effective suppression of background disturbances, such as from magnetizable soils or an electrically weak conducting medium.

In one form of the invention, there is used as a reference transmitter a wire loop which is coupled with the excitation winding and also with the receiver winding and which can be closed through a switch. A further form of the invention makes the separation of the reference phase transmitter reference signal from other signals possible, in that one periodically turns the reference signal off and on by a known switch at a reference switching frequency frs. According to an especially advantageous form of the invention, the separation is achieved by a phase control demodulator which is switched by a first control signal when the reference signal is switched on and by a second control signal shifted by 180° when the reference signal is switched off. A further advantageous form of the invention is provided in which control signals of a phase controlled rectifier are at 90° to the reference signal of the reference phase transmitter.

DESCRIPTION OF PREFERRED EMBODIMENTS

Figure 1:
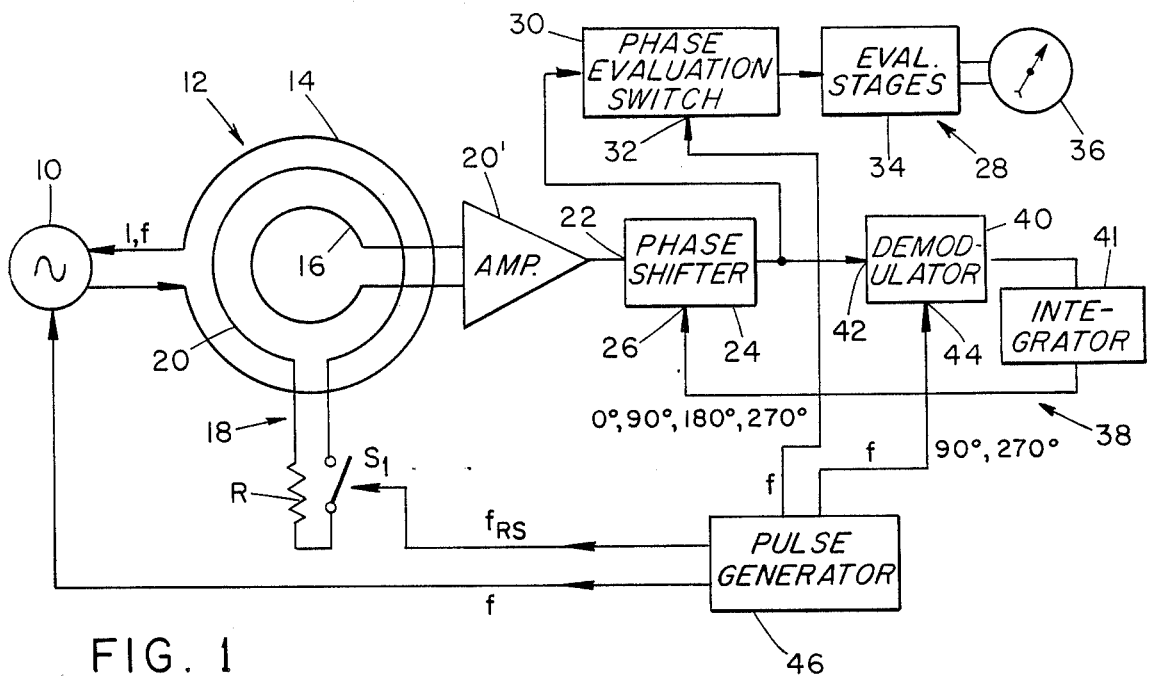
FIG. 1 is a schematic circuit diagram of detection apparatus with a phase regulating circuit.

FIG. 1 shows a function block circuit schematic of a metal detection apparatus according to the present invention. Therein, an A.C. current source 10 provides the excitation winding 14 of a detection head 12 with an A.C. current I of frequency f and effects by this an alternating magnetic field in the surroundings of the excitation winding. Likewise, a receiver winding 16 belonging to the detection head 12 picks up signals, which result from the interaction of the magnetic field with electrically conductive sought after objects or with the surrounding medium. Means for compensating the continuous signals that are induced by the excitation winding into the receiving winding, are in the aforedescribed case without relevance and therefore not illustrated. Such means are well known to the experts in the field and can consist, for example, in a special compensation winding or in a differential construction of the receiver winding, these can also, moreover, be formed solely by electronic means and be a part of the evaluation electronics. In the foregoing example, the excitation winding 14 and the receiver winding 16 ought to lie in a single plane. Both windings can conventionally possess a plurality of windings.

Approximately in the middle between the windings 14, 16, there is arranged a wire loop 20, which should only consist of a winding and which is coupled with the excitation winding 14 and the receiver winding 16. The wire loop 20 forms a part of a reference phase modifier 18. The latter further includes a collective resistance R of the wire loop 20 and a switch S1, which are connected in series with the wire loop. Closing of the switch S1 modifies the inductive coupling between windings 14 and 16 which, effectively, induces a reference signal in winding 16. The switch S1 is constructed as an electronic switch and can be controlled by an electric signal. One chooses the resistance R so that it is large with respect to the inductive reactance $2\pi$ of the wire loop 20 with inductance L, thus reference signals are received in the receiver winding whose current voltage phase angle is substantially zero. The output of the receiver coil 16 is connected to the input of a preamplifier 20', the output of the latter being interconnected with the signal input 22 of a phase shift member 24, the latter possessing a control input 26. A phase shift member 24 is well-known to those skilled in the electronic circuit art. Through control signals to the control input 26, the phase of signals reaching the signal input 22 is changed. A band pass filter can be provided as the phase shift member 24.

Broadly speaking, the reference signal provided by 18 controls the phase shifter 24 to maintain constant phase transmission between winding 16 and phase evaluation means to be described. To suppress any undesirable influence on phase control effected by signals in the winding 16 resulting, say, from magnetizable soil, such signals neutralize each other in the first and second halves of a given period T, while the desired reference signal exists only in the first half of T when S1 is closed.

The output of the phase shift member 24 is connected to the input of the evaluation electronics 28 consisting of phase evaluation switch 30 with a control input 32, further evaluation stages 34 and an indicator means 36. The evaluation including phase evaluation is in this connection not important. It can be carried out in a number of known ways and is, therefore, not described here. For the particular purpose of the invention, a phase regulating circuit 38 consists of the phase shifting member 24, a phase selective demodulator 40 and an integrating member 41, all of which will be described later herein in different constructions.

The signal input 42 of the demodulator 40 is interconnected with the output of the phase shifting member 24, and the output of the phase selective demodulator 40 via integrator 41 is a control input 26 for the phase shifting member 24. The phase selective demodulator 40 possesses furthermore a control input 44. The described metal detection apparatus also includes clock pulse generator 46 with a quartz oscillator generating a basic frequency fa from which (a) the current source 10 is energized to provide the excitation current I of frequency f and (b) the reference switching frequency FRS for the switch S1 of the reference phase transmitter 18 is provided through frequency division. There are further extracted from the pulse generator 46 control signals of frequency f in the phase of the quadrants of the impedance plane for controlling the phase selective demodulator 40 and the phase evaluation switching 30.

Figure 5A:
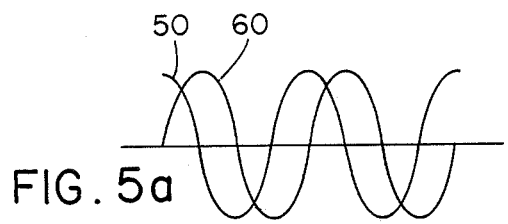
FIGS. 5a–5i and 5k–5m show a timing diagram phase of demodulator control signals.
Figure 5G:
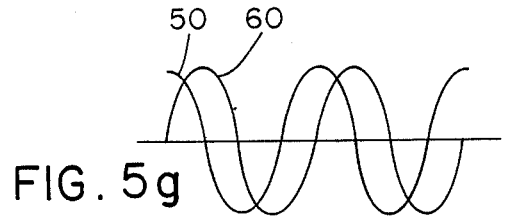
Figure 5B:
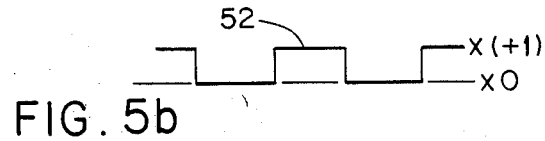
Figure 5H:
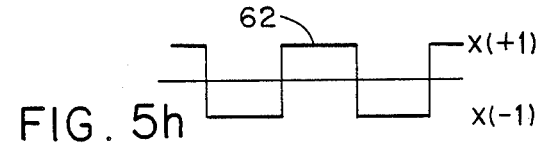
Figure 5C:
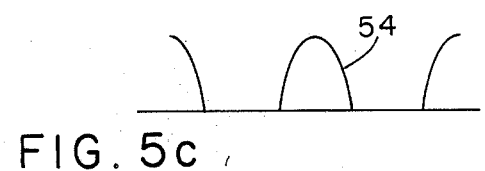
Figure 5I:
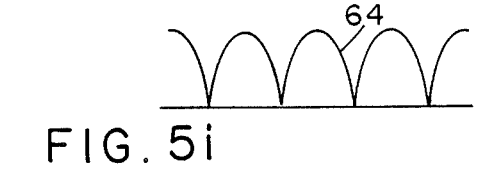
Figure 5D:
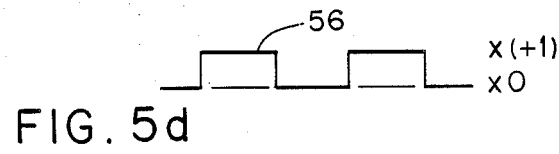
Figure 5K:
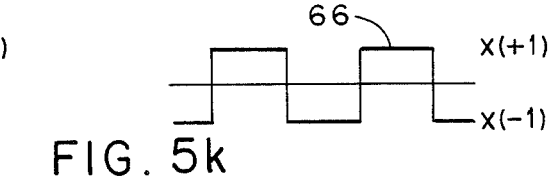
Figure 5E:
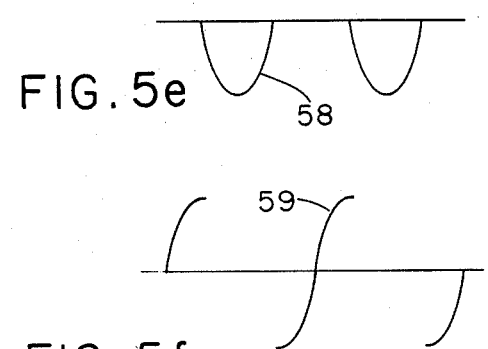
Figure 5L:
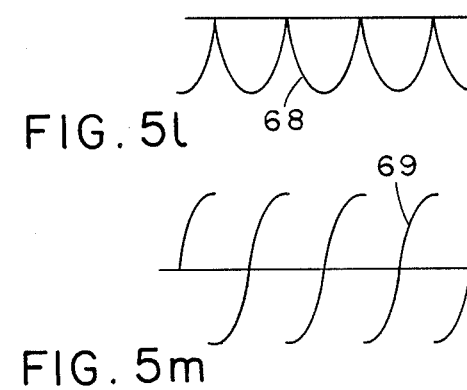
Figure 5F:
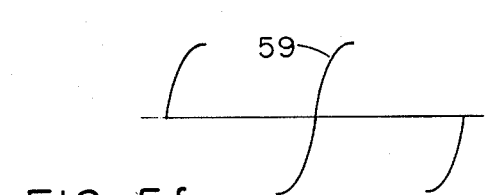
Figure 5M:
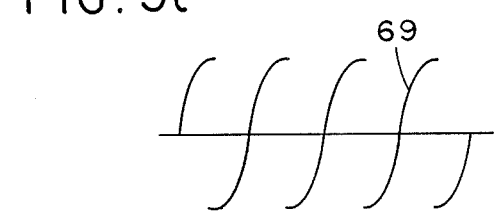
Figure 6A:
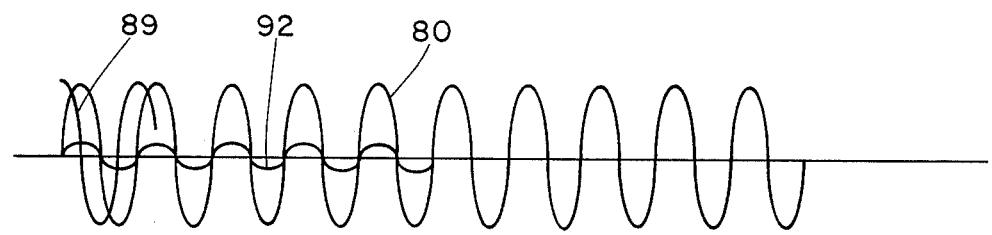
FIGS. 6a–6g, 7a–7i and 7k and 8a–8i and 8k show timing diagrams of demodulator control signals for FIGS. 2, 3 and 4, respectively.
Figure 6B:
Figure 6C:
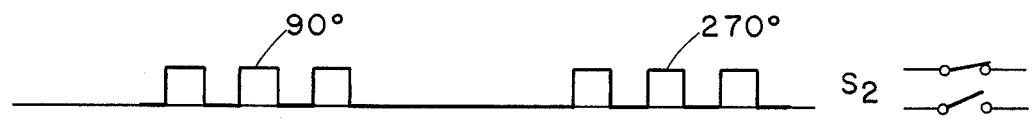
Figure 6D:
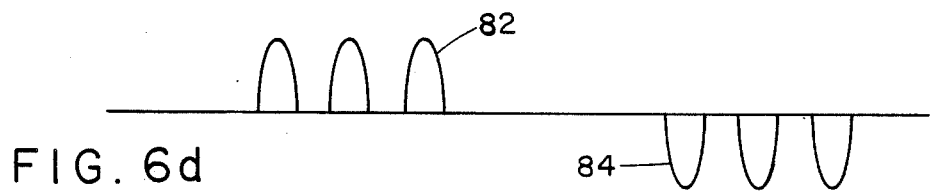
Figure 6E:
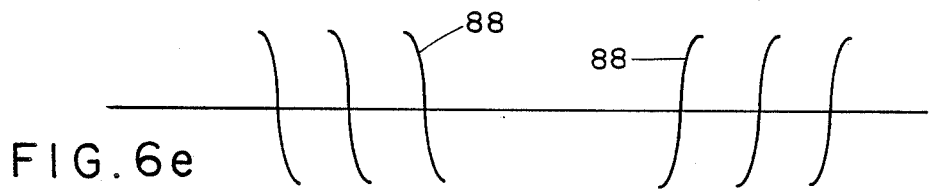
Figure 6F:
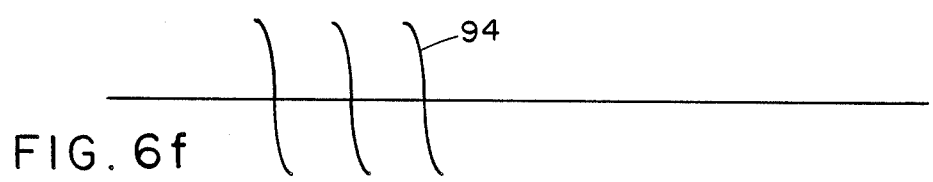
Figure 6G:
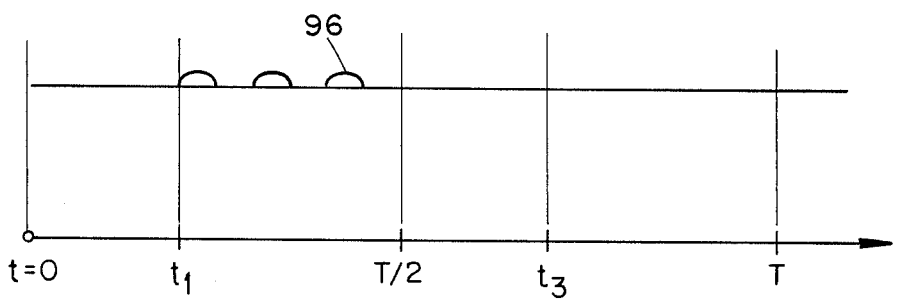
Figure 7A:
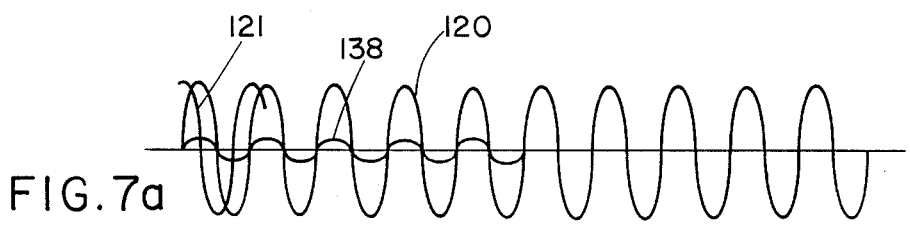
Figure 7B:
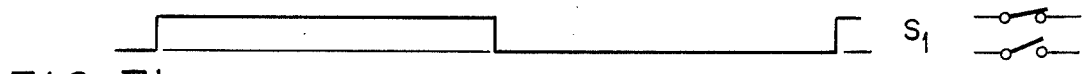
Figure 7C:
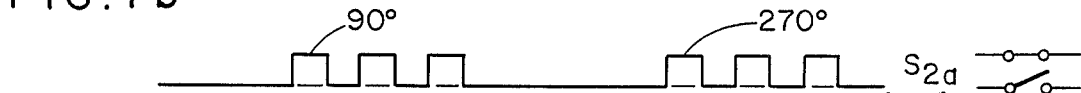
Figure 7D:
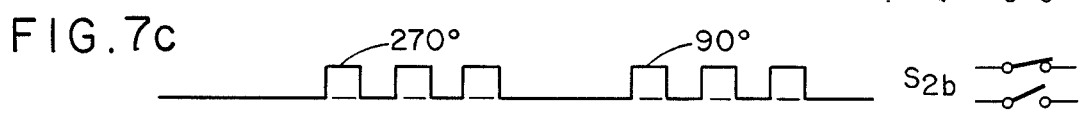
Figure 7E:
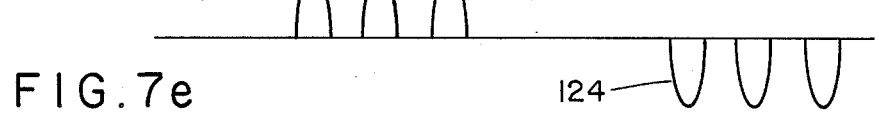
Figure 7F:
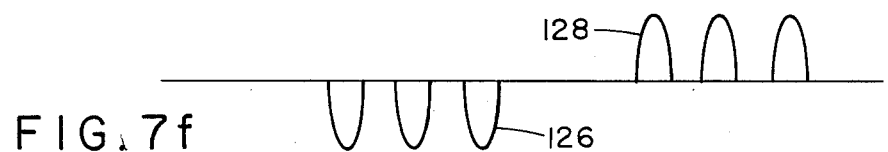
Figure 7G:
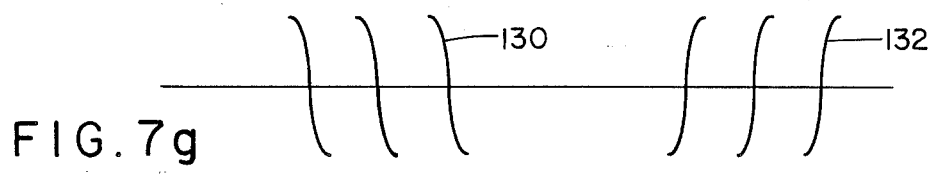
Figure 7H:
Figure 7I:
Figure 7K:
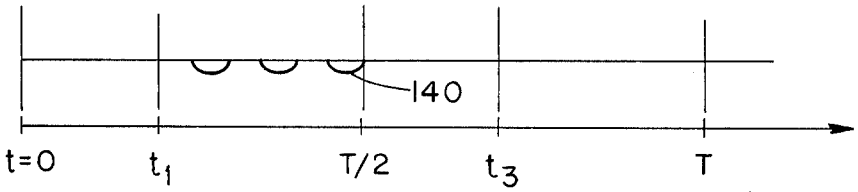
Figure 8A:
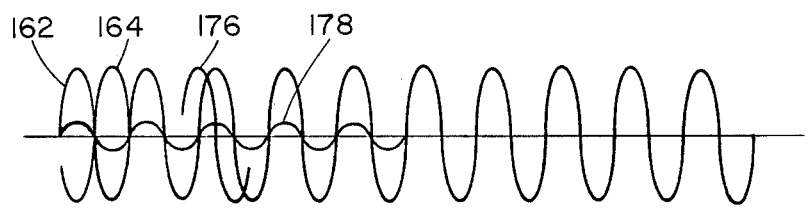
Figure 8B:
Figure 8C:
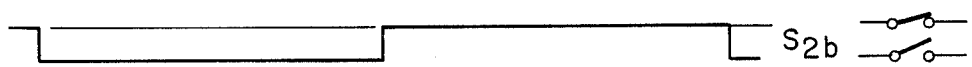
Figure 8D:
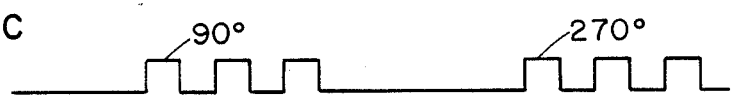
Figure 8E:
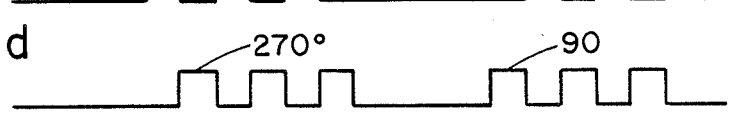
Figure 8F:
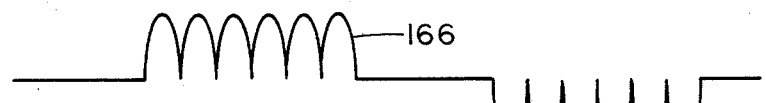
Figure 8G:
Figure 8H:
Figure 8I:
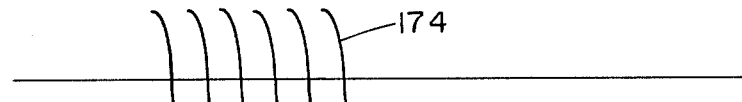
Figure 8K:
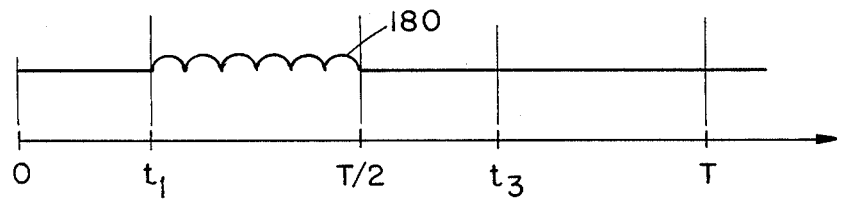

In FIGS. 5a–f there is illustrated for better understanding of the following, the operation of a phase selective demodulator. An A.C. signal 50 (FIG. 5a) is multiplied in synchronism with 90° control voltage pulses 52 (FIG. 5b), the pulse values alternating between 0 and +1. This yields a positive output signal 54 (FIG. 5c). Conducting the same multiplication in synchronism with a 270° control signal 56 (FIG. 5d) yields a negative output signal 58 (FIG. 5e). Multiplying a 0° signal 60 (FIG. 5a) with a 90° control signal 52 (FIG. 5b) with a pulse swing from 0 to +1, yields an output signal 59 (FIG. 5f) with equal valued positive and negative parts, which after integration become 0.

To the right of the half-wave demodulation operation depicted in FIGS. 5a–f there is shown full-wave demodulation in FIGS. 5g–m. In this case, the signals 50 and 60 are multiplied in synchronism with the 90° and 270° control signals, respectively, so that instead of oscillating between 0 and +1, they oscillate between +1 and −1. There is yielded instead of the former positive or negative half-wave signals 54, 58, positive or negative full-wave signals 64, 68.

In a similar manner, the output signal 69 (FIG. 5m), which is the result of the 0° signal 60 multiplied with the 90° control signal 62, is achieved in each half period of a full-wave with equal positive and negative parts, so that once again the integration produces a voltage nulling. Deviations of the phase angle of signal 60 from 0° in either the positive or negative direction results in a corresponding positive, negative deviation, respectively, of the output signal 59, 69 from zero value. This results in the production of a regulation signal in demodulator 40 for input 26 of phase shifting member 24. If the sum of all phase shifts in the common signal channel up to the input 42 of the phase selective demodulator is zero, a corresponding control signal of zero amount exists at the control input 26 of the phase shifting member 24.

Figure 2:
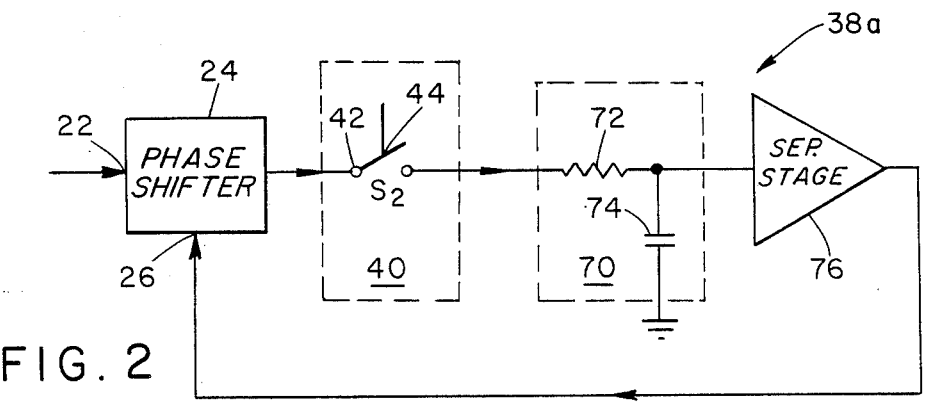
FIGS. 2, 3 and 4 show alternate forms of phase regulating circuits.

FIG. 2 depicts an embodiment of phase control circuit 38a. Therein, the phase selective demodulator is realized through a switch S2 under the control of a signal from pulse generator 46 applied at 44. From the output of the switch S2 a signal passes through a low pass filter 70, consisting of a resistance 72 and condenser 74, and finally through a buffer stage 76 to control input 26 of the phase shifting member 24.

For better understanding of the foregoing, there is depicted in FIG. 6 the signals processed by the phase regulating circuit 38a. At the input of switch S2, there lies a signal 80 (FIG. 6a) of 90° phase, which may be derived from magnetizable earth. Switch S1 (FIG. 6b) becomes closed at time t=0 and at time T/2 is again opened. After a settling period, the switch S2 (FIG. 6c) is periodically closed and opened from time t1 until T/2 in synchronism with the 90° control signal, and after the running of a further settling period is opened and closed in synchronism with the 270° control signal from t3 until T. At the output of the switch S2, there is provided for both halves of the period T identical positive and negative signals (FIG. 6d), so that on passage through the low pass filter 76 no signal remains.

A signal 89 of 0° phase basis exists at the entrance of switch S2 (FIG. 6a), only one period of which is shown, which can be caused by salt water, so there is produced at the output of the switch S2 signal 88 (FIG. 6e), whose positive and negative parts are identical in each control time of switch S2, and which do not pass through the filter 70. This means generally, that signals of any phase basis desired, which are at the input of switch S2, have identical positive and negative signal parts within one pulse period T and thus are eliminated. This does not come about for a reference signal from the phase reference transmitter 18 which is only present when switch S1 is closed, thus in the first half of the pulse time period T. One considers such a signal is put together from a 0° phase component 86 and a 90° phase component 92, thus a signal with phase basis differing from zero forming output signals 94, 96 (FIGS. 6f, 6g), which overlie one another forming a positive value deviating from zero. The reference signal lies exactly in the zero direction, thus consisting (FIG. 6f) of an output signal that does not pass through filter 70 and which is zero at the control input 26 of the phase shifting member if the overall phase shift is zero. In this manner, an effective regulation is carried out on the reference signal corresponding to a phase angle 0°.

At the switch S2 there are placed high demands with respect to the shortness of the switching time and the suppression of switching peaks. One possibility for compensation of switching errors presents itself, for example, by the use in a switching arrangement 38b according to FIG. 3 of two closely adjacent switches. Further advantages are an improved supression of disturbance signals and raising of the regulation signal level by a factor of 2.

Figure 3:
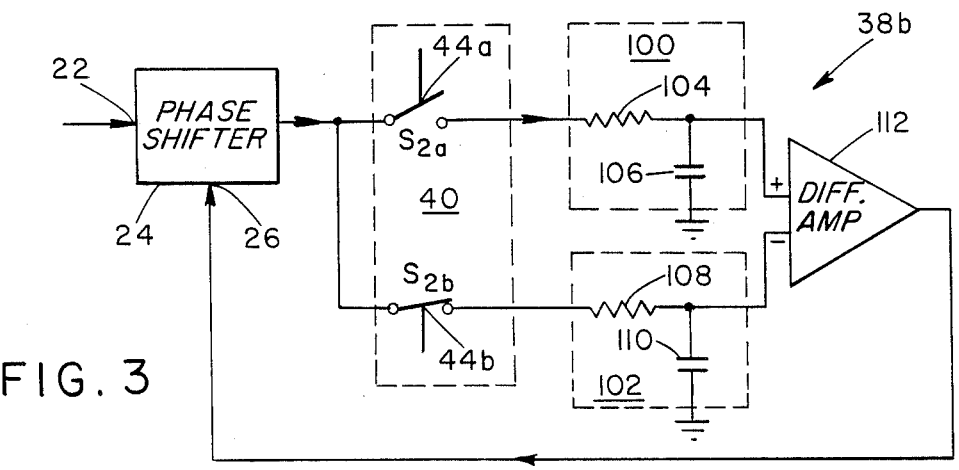

The phase selective demodulator 40 in regulation switching circuit 38f according to FIG. 3, uses two switches S2a and S2b at whose control inputs 44a and 44b are led counter phase alternating 90° and 270° control signals, respectively, at whose outputs consequently exist counter phase signals. Both outputs are connected with the inputs of two low pass filters 100 and 102, which consist of resistances 104, 108 and capacitors 106, 110. The outputs of both filters 100, 102 are connected to the input of a differential amplifier 112, whose output signal lies at control input 26 of the phase shifting member 24.

In FIG. 7 are depicted the signals prepared in the phase regulating circuit 38b. Switch S1 is again closed from t=0 until T/2, open from T/2 until T (FIG. 7b), whereby the reference signal is only contained in the time from t=0 to T/2 in the input signal of both switches S2a and S2b. Switch S2a is opened and closed in the same manner as switch S2 from t1 until T/2 in synchronism with the 90° control signal and from t3 until T in synchronism with the 270° control signal (FIG. 7c). On the contrary, switch S2b is periodically opened and closed from t1 until T/2 in step with the 270° control signal and from t/3 until T with the 90° control signal (FIG. 7d). A signal 120 at the input of both switches S2a, S2b has a phase basis 90° (FIG. 7a) so that there are produced at both outputs signals 122, 124; 126, 128 having both positive and negative parts cancelled during the time T (FIGS. 7e, 7f) which results in no variation at the input of the amplifier 112. Similarly no reaction is produced by the output signals 130, 132; 134, 136 (FIG. 7g, 7h), which arise from an input signal 121 (FIG. 7a) of 0° phase. On the other hand, the effect of a reference signal from the reference phase transmitter must be considered, which signal only exists in the time from t=0 T/2. If such a signal deviates from the phase angle 0°, that is, it possesses a component 138 (FIG. 7a) in the 90° direction, then there will exist at the outputs of both switches S2a, S2b, signals 138, 140 of counter polarity (FIGS. 7i, 7k) to pass through the low pass filters 100, 102 to the input of the differential amplifier 112. In this way, as one can easily understand, the effect of the regulation signals are doubled at the control input 26 of the phase shifting member 24.

Figure 4:
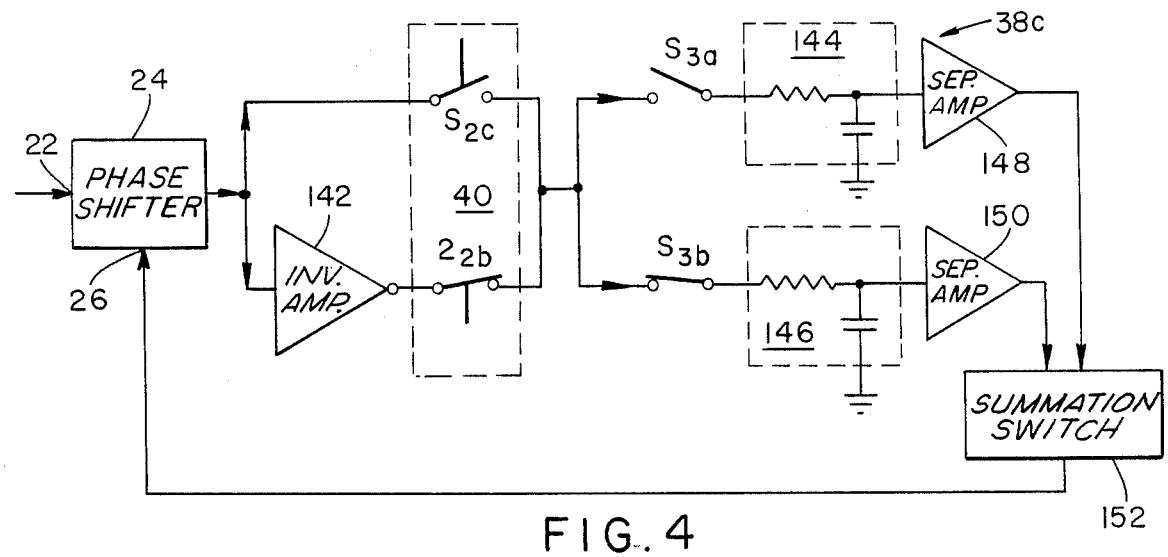

In FIG. 4 there is depicted a further phase regulation circuit 38c of modified construction. Next to the switch S2c, which corresponds to the switch S2 in FIG. 2, there is provided a switch S2b connected by an inverter amplifier 142 to the output of the phase shifting member 24. Both switches S2c and S2d whose outputs are connected in parallel, form a phase selective demodulator 40 in full-wave construction, whose output signals can be passed directly through a low pass filter to the control input 26 of the phase shifting member 24. For complete suppression of the remaining alternating voltage, the necessary large time constant of the low pass member is reduced on conducting through a further switch pair S3a, S3b, whose common input is connected with a common output of the switch pair S2c and S2d. The outputs of both switches S3i a, S3b, are at that time led through low pass filters 144, 146 and buffer amplifiers 148, 150 to the input of a summing member 152 and arrive from their outputs to control input 26 of the phase shifting member 24.

FIG. 8 shows the signals prepared in phase regulation circuit 38c. Switches S1 and S3a close at time t=0 and open at time T/2 (FIG. 8b), switch S3b opens at time T=0 and closes at time T/2 (FIG. 8c). Switch S2c is closed and opened from t1 to T/2 in synchronism with a 90° control signal, and from t3 to T in synchronism with a 270° control signal (FIG. 8d). On the other hand, switch S2d is opened and closed from t1 to T/2 in synchronism with a 270° control signal, and from t3 to T in synchronism with a 90° control signal (FIG. 8e). A 90° signal 162 at the input of switch S2c and counterphase signal 164 at the input of switch S2d (FIG. 8a) bring about at the output of both switches a demodulated full-wave signal with a positive part 166 in the first half and a negative part 168 in the second half of the period T (FIG. 8f). Through the switches S3a and S3b the positive parts 170 are at that time presented to the low pass filter 144 (FIG. 8g) and the negative parts 172 to filter 146 (FIG. 8h). In that way, a permanent change in polarity of the voltage remainder at the filter is avoided and a smaller time constant is possible. Signal voltages of any desired phase basis lead to identical large counter polarity voltages at the output of both separation amplifiers 148, 150. Their suppression takes place through summing in switching circuit 152. The reference signals from the reference phase transmitter 18 are not suppressed here, they are only present in the first half of the time period T. These lead a 0° reference signal 176 to a signal 174 at the input of the filter 144 (FIG. 8i) and to a regulating signal null at control input 26 of the phase shifting member 24. A reference signal component 178 lying in the 90° direction results in a signal voltage 180 at the input of low pass filter 144, which leads to a regulating signal at the control input 26 of the phase shifting member 24 and thereby to a turning back of undesired phase shifts.

What is claimed is:

1. Inductive metal object detection apparatus with a search coil consisting of at least an excitation winding and at least one receiver winding, an A.C. current source connected to the excitation winding to build up a magnetic field in the surroundings, and evaluation circuit apparatus connected to the receiver winding for indicating and evaluating signals induced in the receiver winding by the magnetic field embracing metal objects located in the surroundings, comprising:

a phase regulation circuit which holds the phase angle of an induced signal in a fixed phase relation to a predetermined reference phase angle including, a selectively controllable phase shifting member having an input, an output and a control signal terminal, said input being connected to the receiving winding and output to the evaluation circuit apparatus;

a phase controlled demodulator having an input connected with the phase shifting member output, an output interconnected with the control signal terminal for the phase shifting member, and a control terminal;

a reference phase transmitter which modifies the coupling between the excitation and receiver windings, said transmitter including a wire loop which is coupled with the excitation winding and receiver winding, and a selectively actuatable switch for opening and closing the wire loop during use of the detection apparatus;

means for actuating the switch on and off at a predetermined frequency; and a pulse generator having an output interconnected with the control terminal of the demodulator and actuated to provide output signals for controlling the demodulator on the reference phase transmitter being switched on, said output control signals including a signal of a first control phase, occurring during a first control phase period, and a signal of a second control phase differing from said first control phase by 180°, occurring during a second control phase period.

2. Inductive metal object detection apparatus as in claim 1, in which the control signals are applied to the phase controlled demodulator only after completion of a specified settling time at the beginning of each half period of the control cycle.

3. Inductive metal object detection apparatus as in claim 1, in that a suitable filter for signal preparation is used as the phase shifting member.

4. Inductive metal object detection apparatus as in claim 1, in which a low pass filter has an input connected to the output of the phase controlled demodulator and an output to the control input of the phase shift member.

5. Inductive metal object detection apparatus as in claim 1, in which the phase controlled demodulator has first and second working outputs which are respectively connected to the inputs of first and second low pass filters, the outputs of said first and second filters being connected with the input of a difference forming switching circuit having an output connected to the phase shifting member control input.

6. Inductive metal object detection apparatus as in claim 1, in which switches connect the output of the phase controlled demodulator to the input of a first low pass member if the control signal is in the first control phase and where they connect to the input of a second low pass member if the control signal is in the second control phase, the outputs of both said low pass members being connected with the input of summing circuit having its output connected to the phase shifting member control input.

* * * * *